United States Patent
Ebeling

(10) Patent No.: US 6,199,292 B1
(45) Date of Patent: Mar. 13, 2001

(54) ELECTROMECHANICAL DIMENSIONING DEVICE

(75) Inventor: Jeffrey S. Ebeling, Commerce Township, MI (US)

(73) Assignee: Agilent Technologies, Palo Alto, CA (US)

( * ) Notice: Subject to any disclaimer, the term of this patent is extended or adjusted under 35 U.S.C. 154(b) by 0 days.

(21) Appl. No.: 09/186,190

(22) Filed: Nov. 4, 1998

(51) Int. Cl.[7] .............................. G01B 7/00; G01P 3/00; G06K 7/10
(52) U.S. Cl. .............................. 33/775; 33/780; 33/772; 33/773; 33/708; 324/174; 235/472.03
(58) Field of Search .......................... 33/781, 780, 779, 33/810, 573, 512, 707, 708, 775, 772, 773, 782, 755, 763, 760, 768, 770; 340/573.6, 573.4; 324/174; 235/472.03

(56) References Cited

U.S. PATENT DOCUMENTS

| | | | |
|---|---|---|---|
| 3,041,483 | * 6/1962 | Ebbinghaus et al. | 324/179 |
| 3,732,623 | 5/1973 | Bopst, III | 33/141 |
| 3,918,029 | * 11/1975 | Lemelson | 235/472 |
| 3,973,326 | 8/1976 | Gallacher et al. | 33/125 R |
| 4,242,574 | * 12/1980 | Grant | 377/18 |
| 4,308,665 | * 1/1982 | Losch | 33/781 |
| 4,457,016 | * 6/1984 | Pfeffer | 382/313 |
| 4,468,860 | 9/1984 | Rodengen | 33/148 H |
| 4,586,150 | 4/1986 | Budziak et al. | 364/562 |
| 4,711,034 | 12/1987 | Koizumi | 33/172 E |
| 4,914,280 | * 4/1990 | Peterson | 235/472 |
| 5,173,693 | * 12/1992 | Fry | 341/15 |
| 5,331,118 | * 7/1994 | Jensen | 177/25.14 |
| 5,433,014 | 7/1995 | Falk et al. | 33/763 |
| 5,493,786 | 2/1996 | Thomson | 33/1 G |
| 5,757,676 | * 5/1998 | Hobelsberger | 702/145 |
| 5,894,678 | * 4/1999 | Masreliez et al. | 33/762 |
| 6,109,527 | * 8/2000 | Koizumi et al. | 235/472.01 |

FOREIGN PATENT DOCUMENTS

| | | | |
|---|---|---|---|
| 2751620 | * 5/1978 | (DE) | 33/780 |
| 3245864 | * 6/1984 | (DE) | 33/779 |
| 2069145 | * 8/1981 | (JP) | 324/179 |
| 3-6901 | * 2/1985 | (JP) | 33/779 |
| 1-91010 | * 8/1989 | (JP) | 33/779 |

* cited by examiner

Primary Examiner—Diego Gutierrez
Assistant Examiner—Maria Fernandez
(74) Attorney, Agent, or Firm—Jack H. Wu

(57) ABSTRACT

An electromechanical dimensioning device measures dimensional attributes of an object and transmits the dimensional attributes from the dimensioning device to a remote receiving device. The dimensioning device converts rotational motion of a measuring wheel into a linear distance traveled by the wheel. In one embodiment, the dimensioning device incorporates a rechargeable battery power source and a radio frequency transceiver, allowing fully portable operation. The dimensioning device also optionally includes a bar code scanner for identifying the dimensioned object.

20 Claims, 15 Drawing Sheets

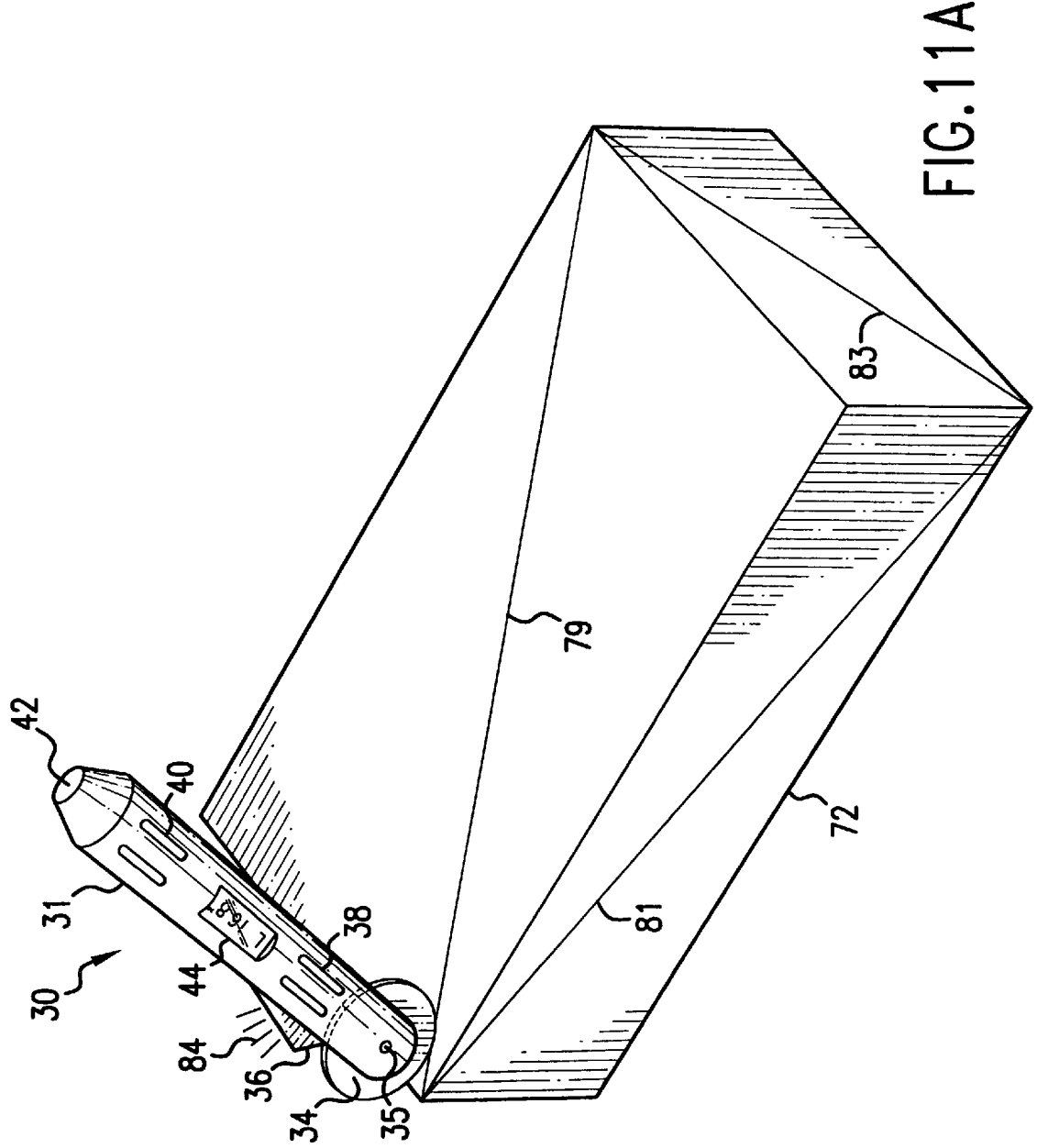

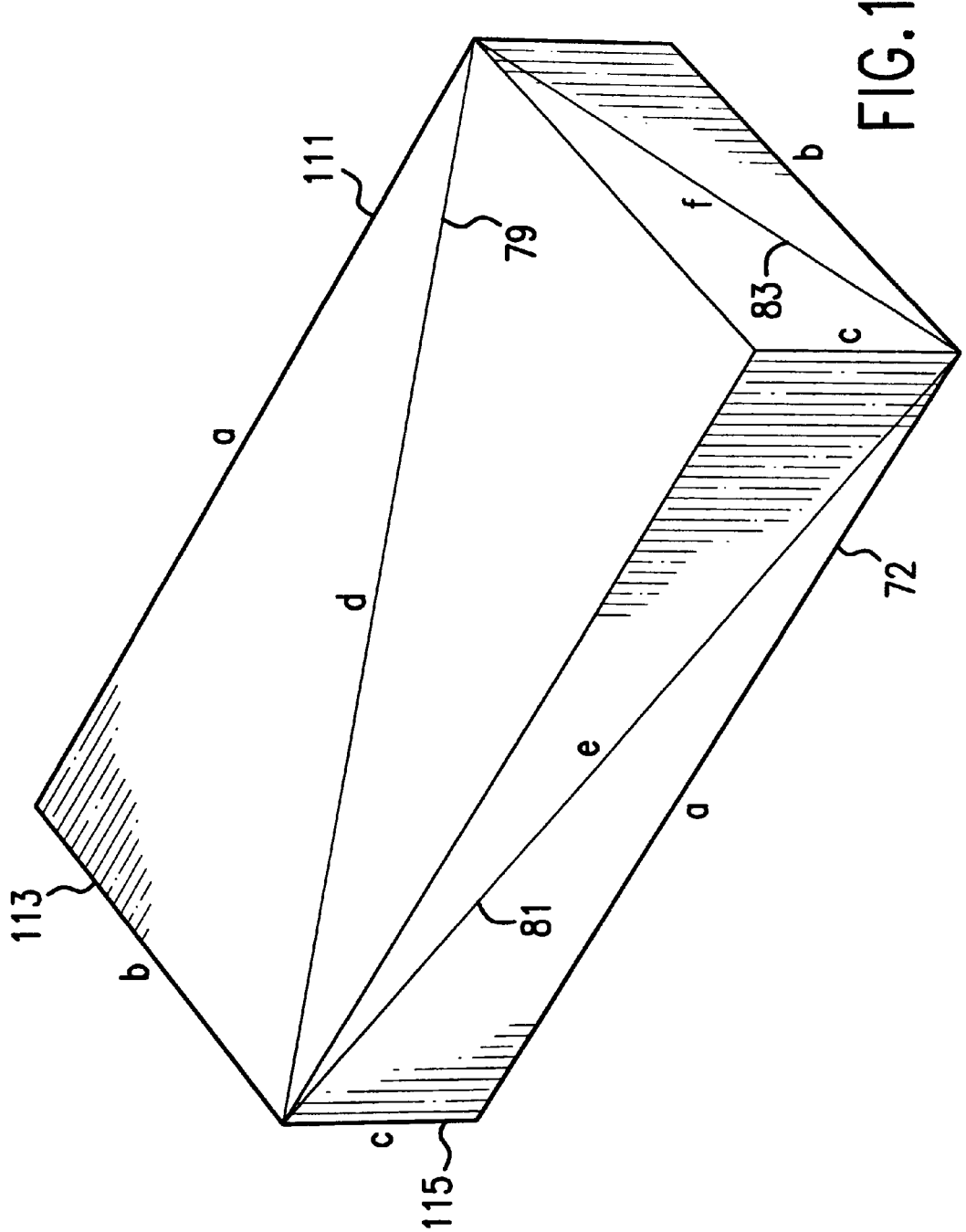

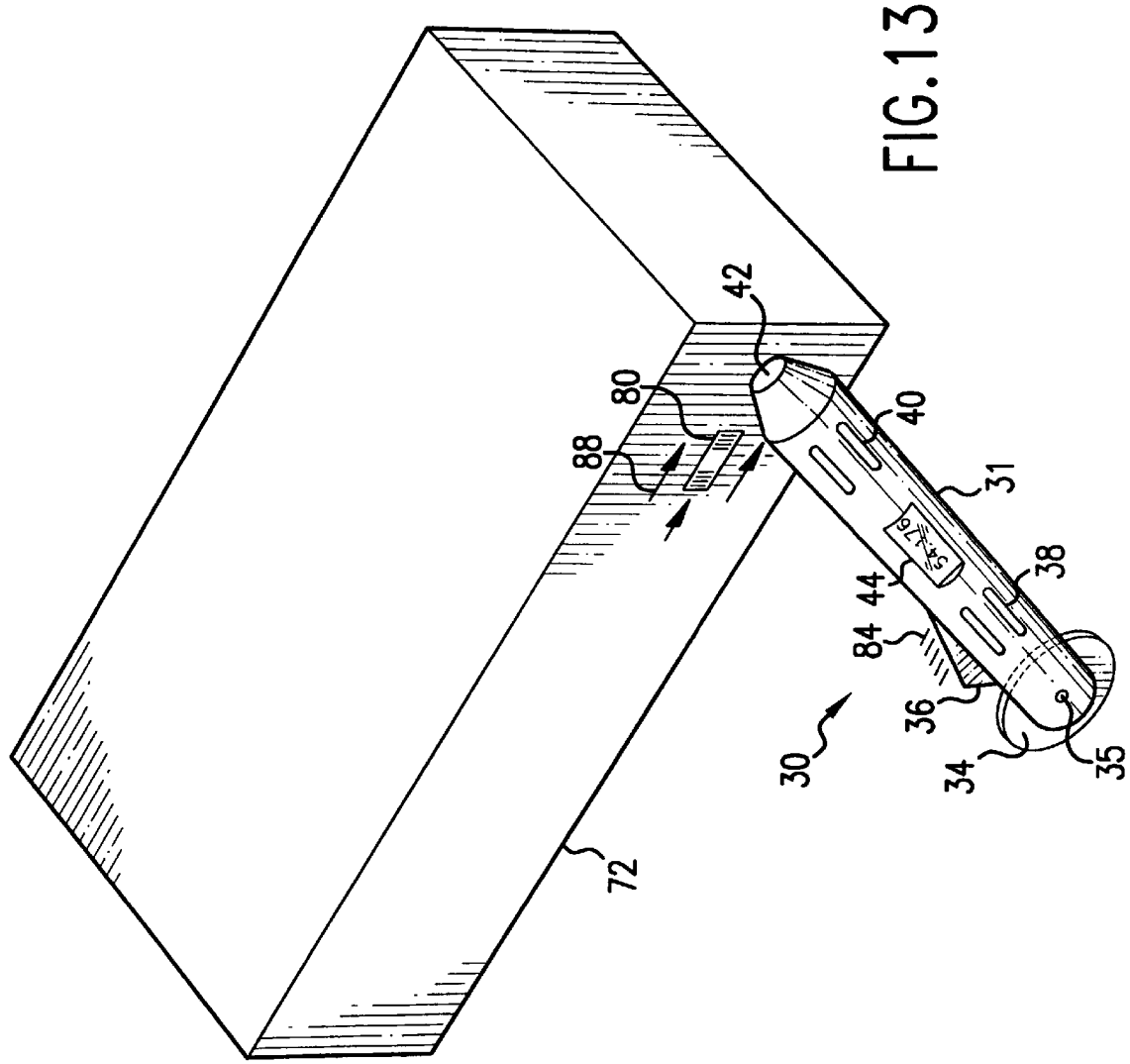

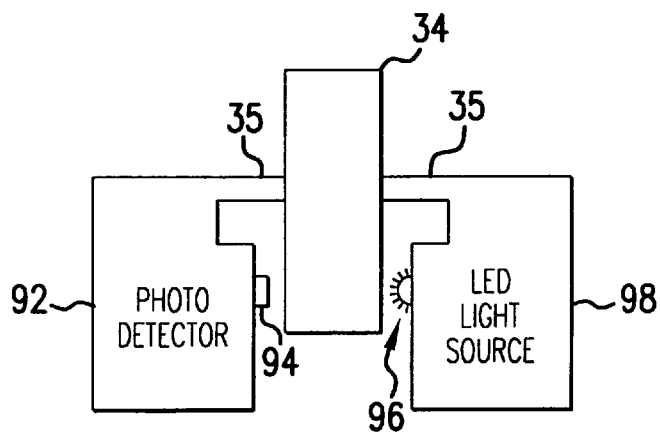
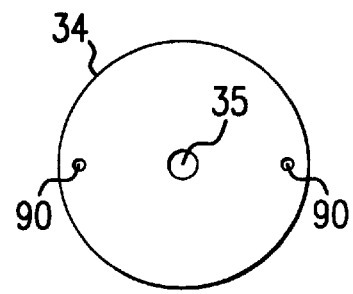
FIG.14A  FIG.14B
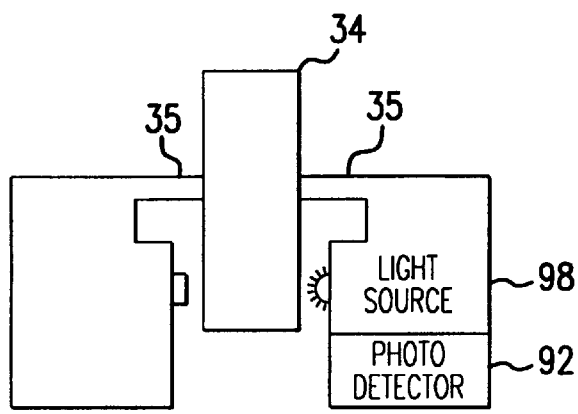
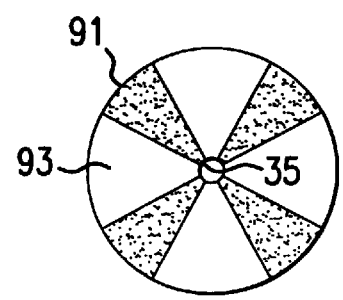
FIG.14D  FIG.14C

ELECTROMECHANICAL DIMENSIONING DEVICE

THE FIELD OF THE INVENTION

The present invention relates to electromechanical measuring devices, and, more particularly to an apparatus and method for electromechanically measuring dimensional attributes of objects with a measuring device, then transferring the dimensional attributes from the measuring device to a remote receiving device.

BACKGROUND OF THE INVENTION

Package delivery service companies, such as Federal Express and United Parcel Service (UPS), have begun to deploy technology to track packages from pick-up to delivery. A typical package tracking system encodes a tracking identifier onto packages, and the tracking identifier is scanned at various points within the package delivery system to produce package location information. As a package moves from point-to-point within the delivery system, the package location information is transmitted to a centralized tracking computer. Both the delivery service company and its customers can access the package location information in the centralized tracking computer to accurately pinpoint the location of a package within the delivery system.

While state-of-the-art package tracking systems prove quite useful in tracking the progress of a package through a package delivery system, most package tracking systems do not track information on the physical characteristics of the package, such as package dimensions and volume. The dimensional information is of great interest to the package delivery service company, since such information allows the company to efficiently allocate delivery resources within the package delivery system.

For example, planes usually reach their volume limit before they meet their weight limit. Thus, having early access to dimensional characteristics on each package shipped within the delivery system would enable a delivery service company to schedule a plane having a volume capacity closely matching the aggregate volume of the packages scheduled for a given route within the delivery system. Likewise, the dimensional information would also prove useful in efficiently allocating ground transportation resources, such as semi-trailers and delivery trucks.

In order to be most useful, the dimensional characteristics of a package should be entered into the package tracking system as early as possible, so that the delivery service company has adequate time to adjust delivery resources. Optimally, the dimensional information should be gathered and transmitted as soon as the delivery service company receives the package. Since small trucks making frequent stops at numerous remote locations pick up the majority of packages in the delivery system, there is a need to provide drivers of these small trucks, or other persons receiving packages into the delivery system, with a portable, inexpensive, accurate and rapid method of obtaining and transmitting package dimensional information to a centralized tracking computer.

SUMMARY OF THE INVENTION

The present invention provides an electromechanical dimensioning device which communicates with an external device. The dimensioning device includes a measuring instrument for obtaining a dimensional measurement of an object and providing a dimensional measurement signal representative of the dimensional measurement. The dimensioning device also includes a processor coupled to the measuring instrument for receiving and processing the dimensional measurement signal to generate a set of dimensional transmission data. Finally, the dimensioning device includes an external interface coupled to the processor for receiving the set of dimensional transmission data from the processor, and transmitting the set of dimensional transmission data to the external device.

In one preferred embodiment of the present invention, the dimensioning device is of a portable, wireless design, approximately the size of a pocket pen. An integrated, rechargeable battery provides the power source for the device. The measuring instrument includes a measuring wheel of known circumference located at one end of the device. In one embodiment, the measuring wheel is rolled across the dimensional surfaces of an object, in order to determine the volume of the object. In an alternative embodiment, a spring loaded filament wrapped around the measuring wheel is deployed like a tape measure, rotating the measuring wheel as the filament is deployed.

In one embodiment of the present invention, a transducer converts the rotational motion of the measuring wheel into electrical pulse information. A processor in the dimensioning device converts the electrical pulse information into a linear measurement. In another embodiment of the present invention, the rotational motion of the measuring wheel is measured optically by positioning a light emitting diode (LED) at one side of the measuring wheel and a photodetector at an opposite side of the measuring wheel such that one or more evenly spaced holes formed within the measuring wheel pass between the LED and the photodetector. In another embodiment, the measuring wheel is "encoded" with evenly spaced white and black segments, and light is reflected off the segments as the wheel rotates. A photodetector is used to count the number of reflecting segments that pass by the photodetector as the measuring wheel rotates.

The dimensional device of the present invention optionally includes an optical scanner for reading bar code information from the object. Optically scanning an object's identifying bar code enables dimensional measurement attributes of an object to be associated with the object's identifying bar code. The dimensioning device also includes a radio frequency transceiver and antenna for transmitting the dimensional measurements and optical bar code information for the object to a remote receiving device. Finally, the dimensioning device optionally includes a display for visually representing the current operating conditions of the dimensioning device.

In one embodiment of the present invention, the dimensioning device is coupled to a remote receiving device via a cable connector. In this embodiment, the dimensioning device can either be powered by an internal, rechargeable battery or by the remote receiving device via the cable connector. In this embodiment, there is no radio frequency transceiver/antenna incorporated within the dimensioning device. Rather, the dimensional measurements, and optionally, bar code information, is sent to the remote receiving device via the cable connector.

The present invention offers a small, lightweight and portable dimensioning device for quickly scanning and measuring packages when they are picked up by a delivery service company. The dimensioning device has the capability to seamlessly transmit package dimension information and bar code package identification information to other radio remote equipped devices. By dimensioning packages as they are picked up, the delivery service company can quickly and efficiently match package volume requirements with available delivery resources.

BRIEF DESCRIPTION OF THE DRAWINGS

FIG. 11A illustrates an object and the dimensioning device of the present invention after measuring a diagonal of a lengthwise planar surface of the object.

FIG. 11B illustrates a rectangular solid and mathematical relationships between the measured diagonals of three planar surfaces of the rectangular solid, and the length, width and height measurements of the rectangular solid.

FIG. 13 illustrates an object and the dimensioning device of the present invention just after reading a barcode affixed to a surface of the object.

FIG. 14A illustrates one embodiment of the present invention wherein a light emitting diode (LED), is positioned adjacent a first side of the measuring wheel, and a photodetector is positioned adjacent a second side of the measuring wheel, such that one or more holes of the wheel passes between the LED and the photodetector as the measuring wheel undergoes rotation.

FIG. 14B illustrates holes formed within the surface of the measuring wheel illustrated in FIG. 14A.

FIG. 14C illustrates reflective and non-reflective portions of a first side of the measuring wheel.

FIG. 14D illustrates one embodiment of the present invention wherein a light source and a photodetector are positioned adjacent the first side of the measuring wheel, such that as the measuring wheel undergoes rotation, light is reflected off of the reflective portions of the measuring, wheel toward the photodetector.

DESCRIPTION OF THE PREFERRED EMBODIMENTS

In the following, detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
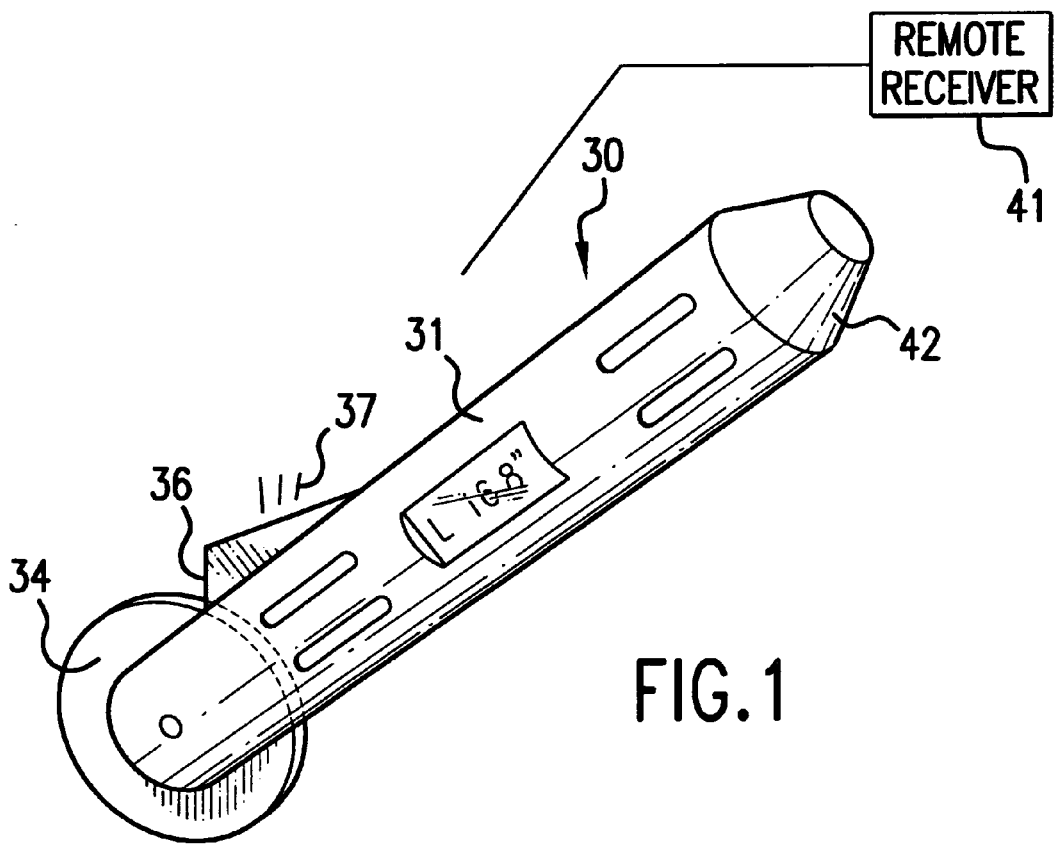
FIG. 1 is a perspective view of a dimensioning device according to the present invention which transmits dimension information to a remote device through an integrated radio interface.

FIG. 1 illustrates a dimensioning) device 30 for transmitting dimension information to a remote device through an integrated radio interface, according to the present invention. In one exemplary embodiment, dimensioning device 30 includes a housing 31 which is cylindrically shaped and is approximately six inches long and approximately one-half inch in diameter. Dimensioning device 30 includes a measuring wheel 34 of known circumference, such that as wheel 34 rotates, the rotational movement is convertible into a linear distance. Dimensioning device 30 also includes an optical scanner 42 for scanning an identifying bar code affixed to an object to be measured.

The embodiment of dimensioning device 30, as illustrated in FIG. 1, is a portable implementation, incorporating a radio frequency transmitter/antenna 36. In this portable, self contained embodiment, dimensional information obtained from measuring wheel 34 and scan information obtained from optical scanner 42 is transmitted, as indicated at 37, via radio frequency transmitter/antenna combination 36 to a remote receiving device 41.

Figure 2A:
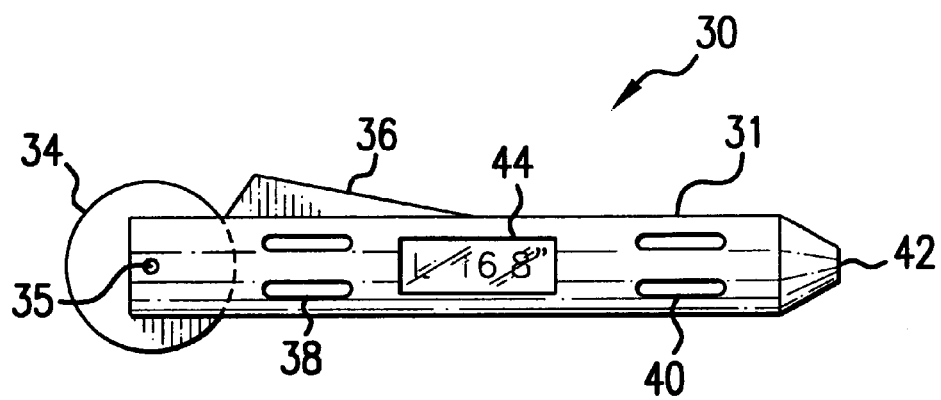
FIG. 2A is a first side of the dimensioning device of FIG. 1.
Figure 2B:
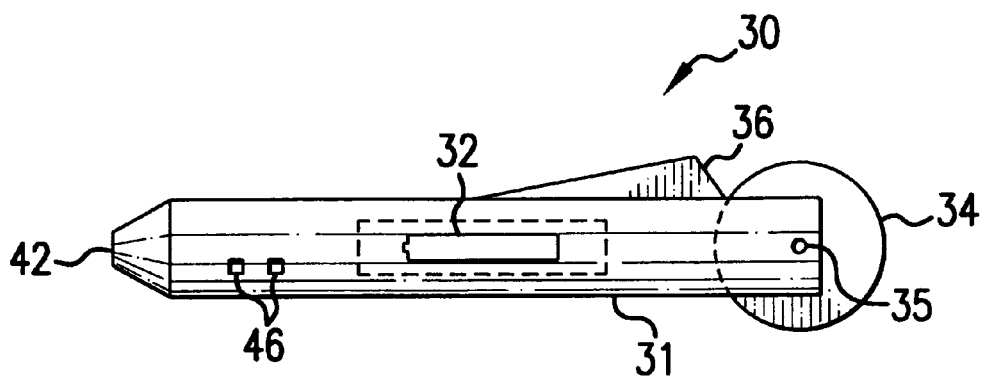
FIG. 2B is a second side view of the dimensioning device of FIG. 1.
Figure 2C:
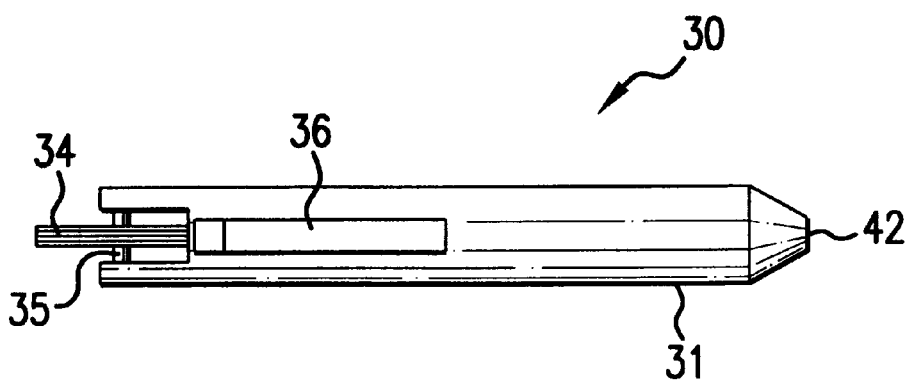
FIG. 2C is a top view of the dimensioning device of FIG. 1.

FIGS. 2A, 2B and 2C illustrate two side views and a top view, respectively, of one embodiment of dimensioning device 30 of the present invention. As illustrated in FIG. 2A, dimensioning device 30 is a portable, wireless design. The electrical components within dimensioning device 30 are powered by a rechargeable battery 32 disposed within housing 31, as illustrated in FIG. 2B. One or more charge contacts 46 arc disposed on the housing of dimensioning device for connection to a battery charger device (not shown). Dimensioning device 30 also includes measuring wheel 34 of known circumference. In one embodiment, measuring wheel 34 has a circumference of approximately one inch, but a measuring wheel having suitable smaller or larger circumferences can also be used. The desired circumference is determined by the particular application of dimensioning device 30. Measuring wheel 34 rotates about an axle 35, and this rotational movement is converted into linear dimensional information.

Radio frequency transmitter/antenna 36 transmits and receives radio frequency information, such as dimensional information and identifying information, to/from dimensioning device 30. The radio frequency transmitter/antenna is formed into a clip, as illustrated in FIG. 2A, which permits the pen shaped dimensioning device 30 to be attached to a shirt pocket or other surface.

A set of one or more dimensional control buttons 38 is located on the exterior of dimensioning device 30. Examples of functions controlled by dimensional controls 38 include: allowing a user to activate/deactivate the dimensioning device 30; switching between measurements; clearing measurements; and transmitting measurements to a receiving device. Dimensioning device 30 also includes a set of one or more scanner control buttons 40, located on the exterior of the dimensioning device. The scanner control buttons 40 control activating/deactivating the optical scanner 42 of dimensioning device 30, clearing scanned information, and sending scanned information to a receiving device.

Dimensioning device 30 optionally includes a display 44. Display 44 displays operational information, such as the current mode of operation of the dimensioning device, numerical dimension information, and battery charge status. In one embodiment, display 44 is an inexpensive multi-character liquid crystal display (LCD), having low power consumption characteristics.

One example application of dimensioning device 30 is for scanning and measuring packages when they are picked up by a delivery service company. The dimensioning device 30 is small, lightweight, and easy to use, and in the case of the embodiment illustrated in FIG. 1, wireless. By using dimensioning device 30, a typical package can be identified and measured to obtain dimensional information, and the identifying and dimensional information can be accurately recorded in approximately 5 seconds. In embodiments where the dimensioning device 30 is powered by an internal, rechargeable battery, dimensioning device 30 is typically capable of making dimensional measurements on more than one hundred packages on a single battery charge.

Figure 3:
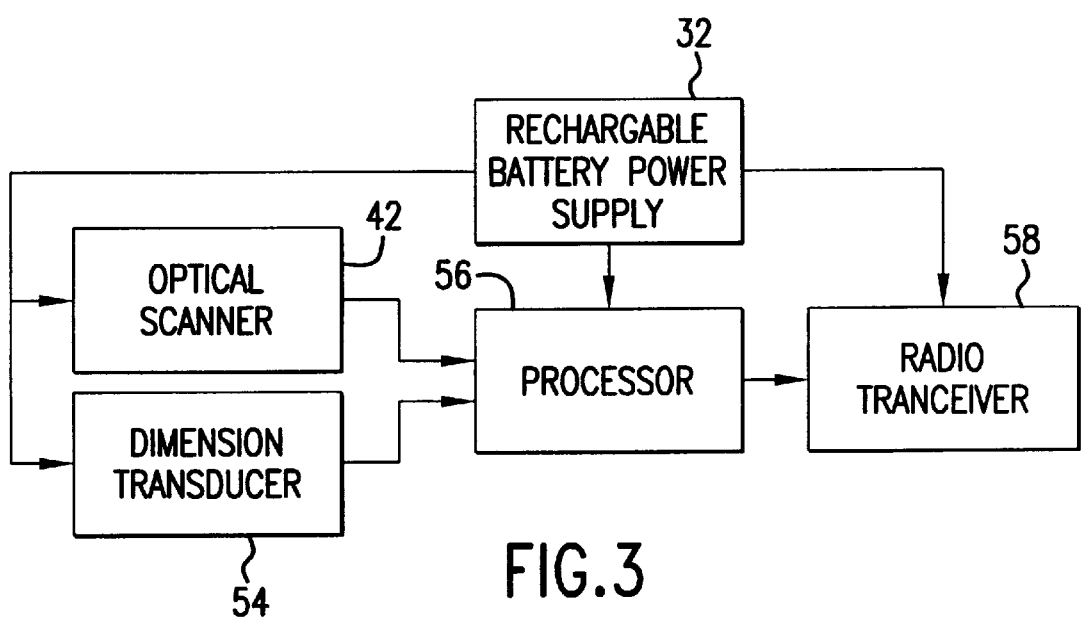
FIG. 3 is a block diagram illustrating internal components of the dimensioning device of FIG. 1.

FIG. 3 is a block diagram illustrating internal components of dimensioning device 30 of the present invention. Optical scanner 42 reads identifying bar code information affixed on a surface of an object. This wireless embodiment of dimensioning device 30 also includes a rechargeable battery power supply 32. Rechargeable battery power supply 32 enables dimensioning device 30 to dimension at least one hundred packages on a single battery charge. Rechargeable battery power supply 32 is any commercially available rechargeable energy cell. Charge contacts 46, such as shown in FIG. 2B, disposed on the housing of dimensioning device 30 allow connection of rechargeable battery power supply 52 to an external battery charger (not shown).

The FIG. 3 wireless embodiment of dimensioning device 30 also includes a dimension transducer 54 for converting rotational motion of measuring wheel 34 into electrical pulse information. Several alternatives exist for performing this conversion, all of which are described in detail below. The wireless embodiment of dimensioning device 30 includes a processor 56. Processor 56 converts the electrical pulse information generated by dimension transducer 54 into a linear measurement. Processor 56 also converts the bar code scan information from optical scanner 42 into an electronic representation of the bar code. Finally, the wireless embodiment of FIG. 3 includes a radio transceiver 58 for sending and receiving radio transmission information from/to the dimensioning device 30. Radio transceiver 58 is a short range, low power device. In one embodiment, radio transceiver 58 transmits on a 2.4 gHz frequency. The 2.4 gHz frequency is utilized worldwide for low power, short range applications. Radio transceiver includes radio frequency transmitter/antenna, as illustrated in FIG. 1 and FIG. 2, element 36.

Figure 4:
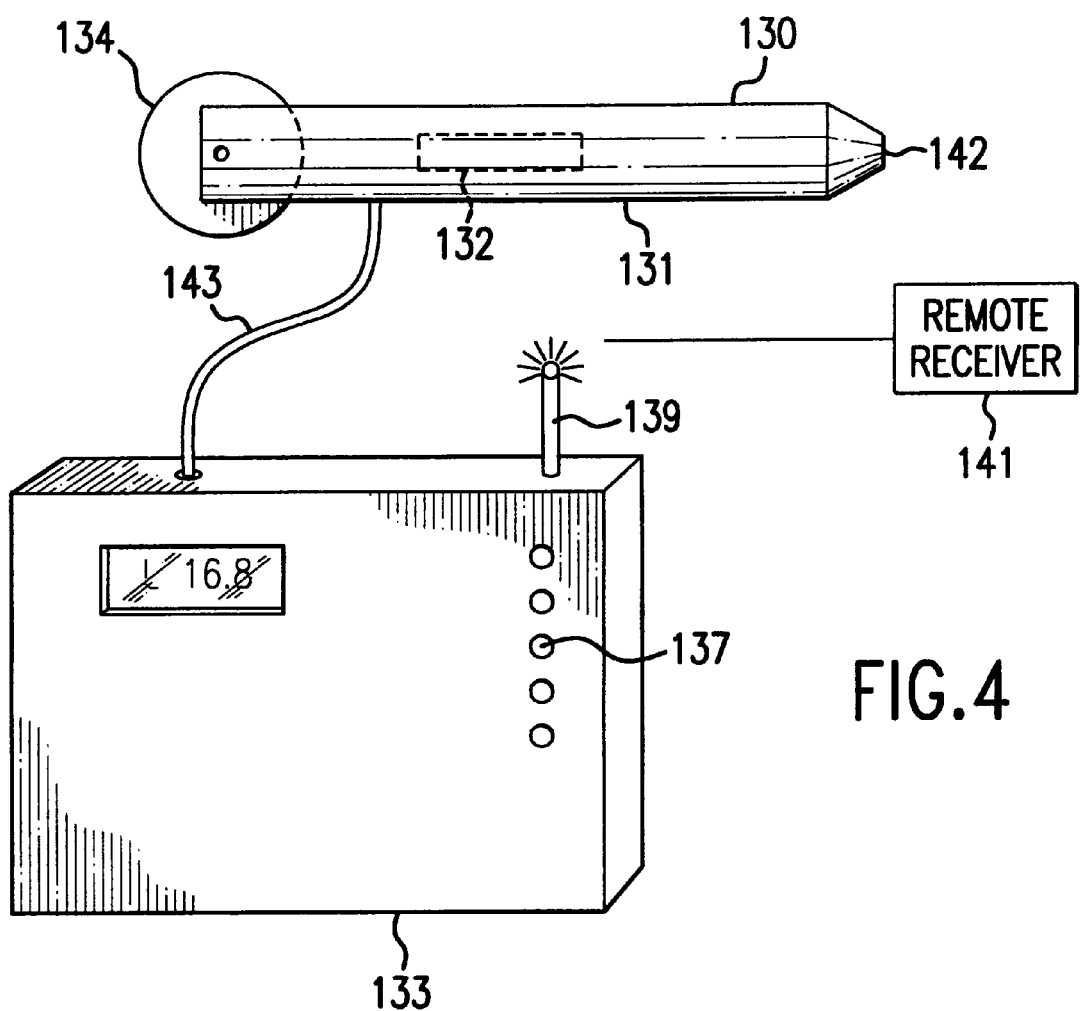
FIG. 4 is a diagram illustrating an alternative embodiment of a dimensioning device according to the present invention which transmits dimension information to a remote device through a wired interface.

FIG. 4 illustrates an alternative embodiment of the present invention, in which a dimensioning device 130 transmits dimension information to a wired remote device 133 through a wired interface. In this embodiment, dimensioning device 130 is coupled to wired remote device 133 via a cable connector 143. Dimensional information obtained from a measuring wheel 134, and scan information obtained from an optical scanner 142 is transmitted from dimensioning device 130 to remote wired device 133 via cable connector 143. Remote wired device 133 optionally transmits, via radio frequency, the dimensional information to remote receiving device 141 via a transmitter 139. Dimensioning device 130 is powered by a battery 132 within a housing 131 of the dimensioning device 130, alternatively, dimensioning device 130 is powered by remote wired device 133 via cable connector 143.

Figure 5:
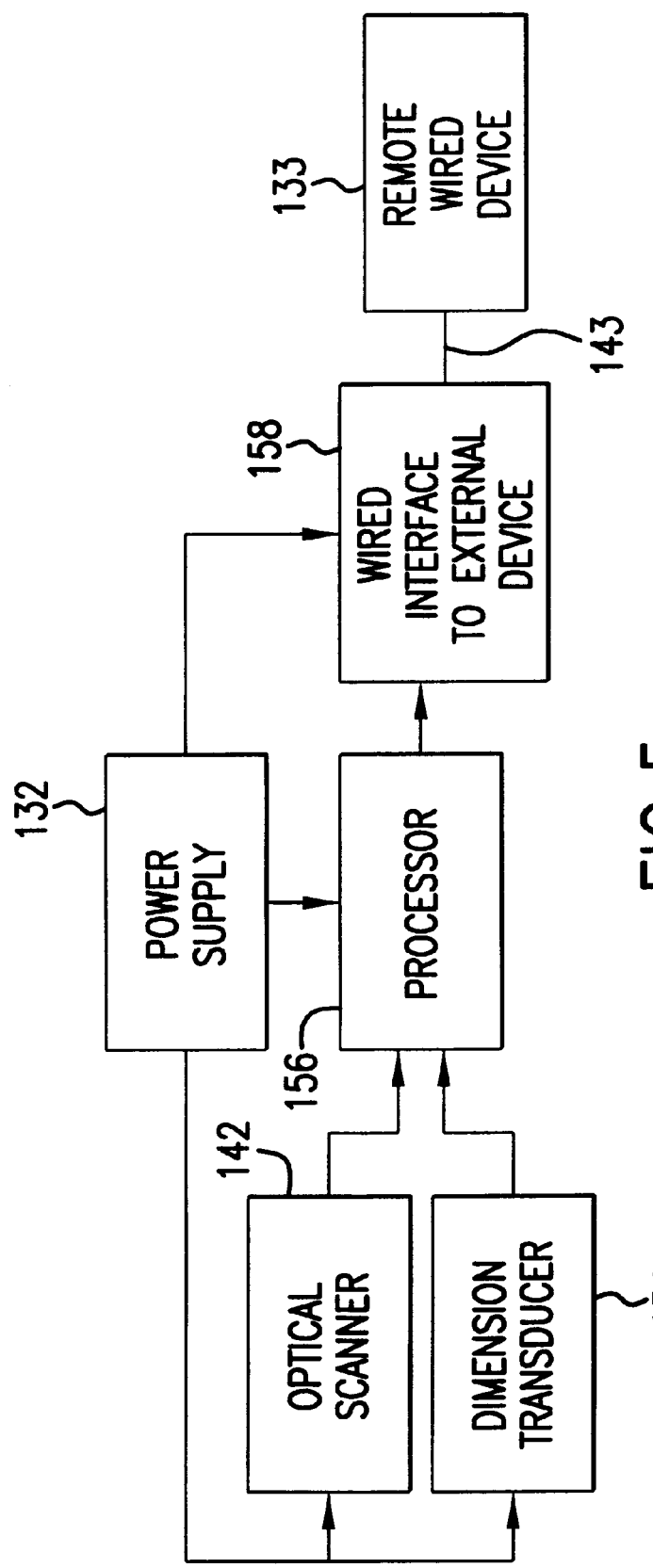
FIG. 5 is a block diagram illustrating major internal components of the alternative embodiment of the dimensioning device illustrated in FIG. 4.

FIG. 5 is a block diagram illustrating internal components of the alternate embodiment of dimensioning device 130, as illustrated in FIG. 4. Optical scanner 142 reads identifying bar code information affixed to a surface of an object. The wired embodiment of dimensional device 130 also includes a dimension transducer 154 for converting the rotational motion of measuring wheel 134 into electrical pulse information. Processor 156 converts the electrical pulse information generated by dimension transducer 154 into a linear measurement. Processor 156 also converts the bar code scan information from optical scanner 142 into an electronic representation of the bar code. Finally, the alternate embodiment of FIG. 5 includes a wired interface 158 for sending and receiving radio transmission information between dimensioning device 130 and remote wired device 133 via cable connector 143.

Figure 6A:
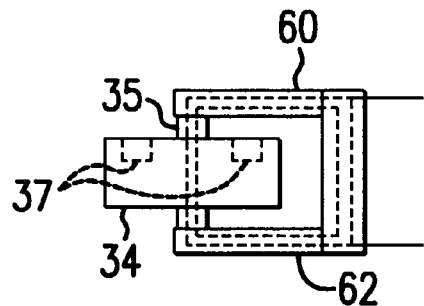
FIG. 6A is a close-up top view of the measuring wheel and a surrounding frame disposed at an end of the dimensioning device of the present invention.
Figure 6B:
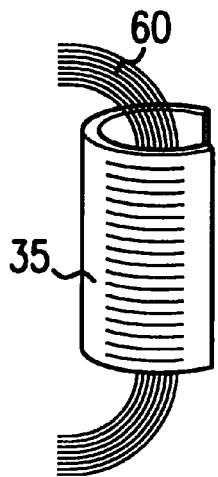
FIG. 6B is a perspective view of the C-shaped axle of the dimensioning device, where a wire coil is wound through the center of the axle.

FIG. 6A is a close-up top view of measuring wheel 34 and a surrounding frame 62 disposed at an end of dimensioning device 30 of the present invention, and FIG. 6B is a perspective view of the C-shaped axle 35 of dimensioning device 30, where a wire coil 60 is wound through the center of the axle.

In one embodiment of the present invention, as illustrated in FIG. 6A, measuring wheel 34 of known circumference has one or more magnets, illustrated at 37, disposed at substantially evenly spaced locations around the perimeter of the measuring wheel 34. Magnets 37 are embedded in measuring wheel 34 itself or embedded within a tread distributed around the outer circumference of measuring wheel 34. A wire coil 60 is wound around axle 35 and surrounding frame 62 of measuring wheel 34, such that as measuring wheel 34 rotates within frame 62, magnets 37 pass through wire coil 60 to thereby generate electrical pulses in wire coil 60. In one embodiment, axle 35 is a cylinder with a slot down the entire length, as illustrated in FIG. 6B. In this embodiment, axle 35 looks like the letter "C" in cross section to allow easy wrapping of wire coil 60 around axle 35. The accuracy of measuring wheel 34 is enhanced by disposing more substantially evenly spaced magnets around the outer circumference of measuring wheel 34, since more magnets produce a greater number of electric pulses to count. For example, assuming that measuring wheel 34 has a one inch circumference, a single magnet disposed in the outer circumference of measuring wheel 34 produces a measurement resolution accuracy of 1 inch. If four evenly spaced magnets are disposed in the outer circumference of measuring wheel 34 having the same one inch circumference, the measurement resolution accuracy is enhanced to 0.25 inch.

The dimension transducer 54 described above requires some special manufacturing considerations for cost efficiency purposes. In one embodiment, measuring wheel 34 includes two identical pieces, each with magnet 37, that fit together around the axle to form the complete measuring wheel 34. By making the wheel pieces symmetrical, tooling costs are minimized. There are a number of alternative manufacturing techniques for fitting the pieces around axle 35, such as, gluing, snap fitting, or welding the pieces.

Figure 7:
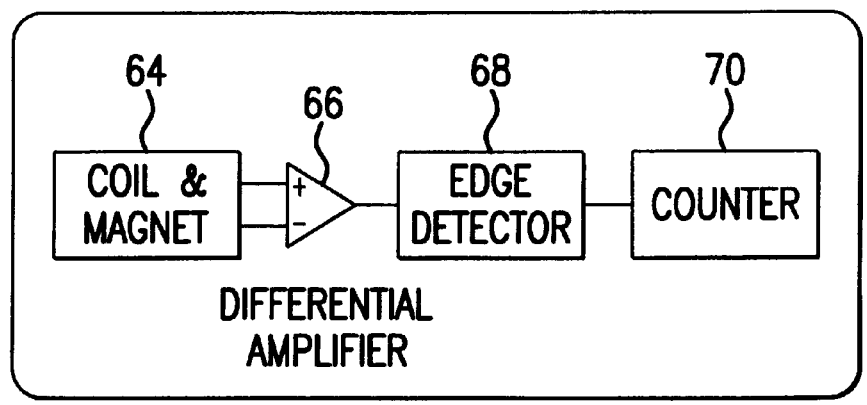
FIG. 7 is a block diagram of components used within the magnet/coil embodiment of FIGS. 6A and 6B for counting the number of rotations of the measuring wheel.

FIG. 7 is a block diagram of components of the magnet/coil embodiment of FIGS. 6A and 6B employed for counting the number of rotations of measuring wheel 34. As indicated at block 64, measuring wheel 34 of known dimension has one or more magnets 37 disposed at substantially evenly spaced locations, embedded in measuring wheel 34 itself or on a tread, as shown in FIG. 6A and FIG. 6B. Wire coil 60 passes through axle 35 of measuring wheel 34 and surrounding frame 62, such that as measuring wheel 34 rotates, magnets 37 pass through wire coil 60 to thereby generate electric pulses in wire coil 60. The electrical pulses are optionally fed through an amplifier circuit (such as differential amplifier 66), which receives and amplifies the electrical pulses. An edge detector 68 receives the amplified electrical pulses from differential amplifier 66 and activates a counter signal on each occurrence of one magnet 37 passing within wire coil 60. The counter signals from edge detector 68 are counted, by a counter 70, to determine the linear distance "traversed" by measuring wheel 34.

Figure 8:
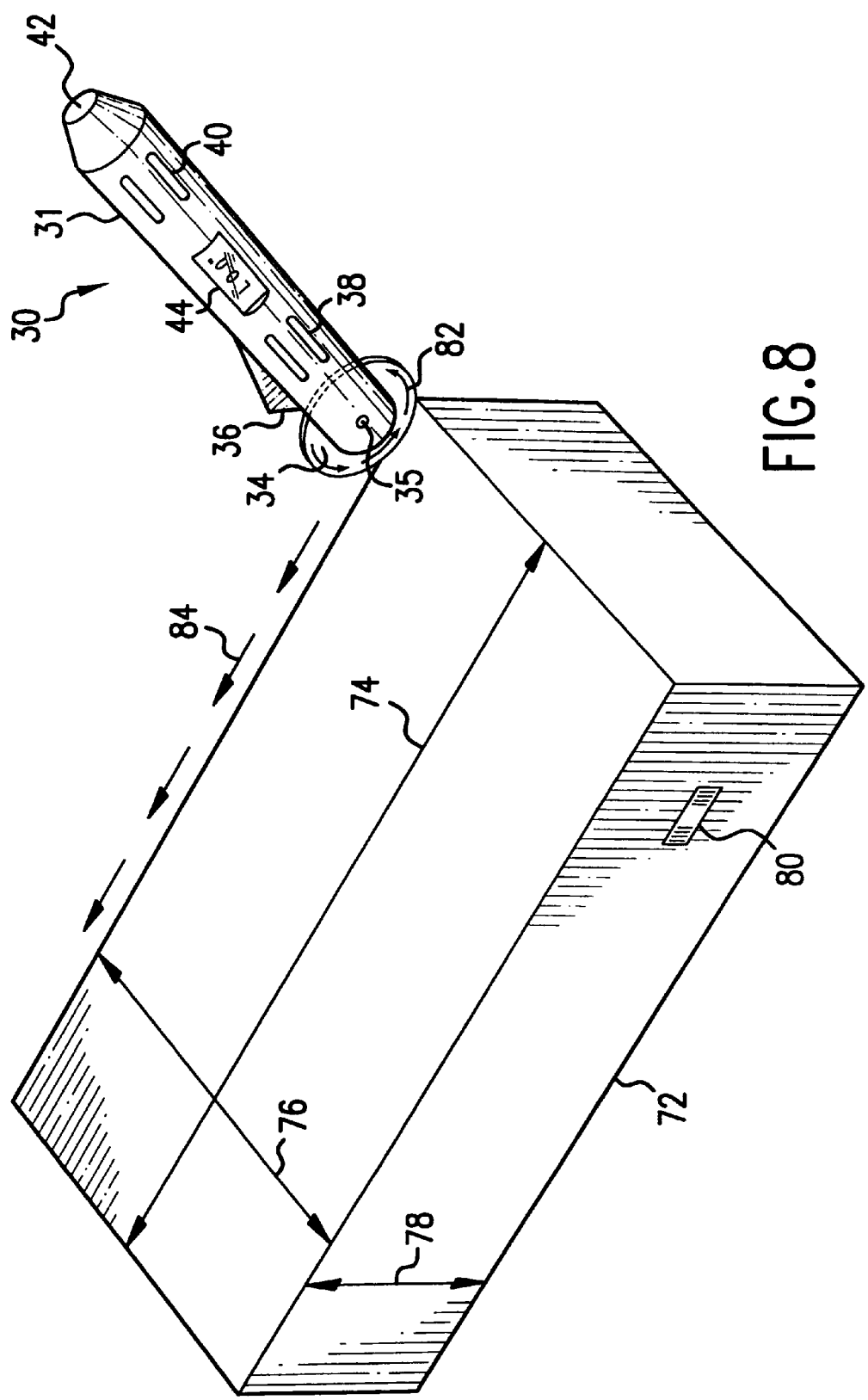
FIG. 8 illustrates an object and the dimensioning device of the present invention prior to measuring a dimension of the object.

FIG. 8 illustrates an object 72 and dimensioning device 30 of the present invention prior to measuring a dimension of the object. In the illustrated embodiment, dimensioning device 30 is first activated and initialized, as indicated by display 44. In one embodiment, measuring device 30 is activated via dimension controls 38. Dimension controls 38 also allow dimensioning device 30 to be reset before each measurement. In an alternative embodiment, the dimensioning device 30 employs autodetect activation via interrupts. For example, rolling measuring wheel 34 automatically activates dimensioning device 30. After activation and initialization, measuring wheel 34 is placed at a dimensional edge of object 72, and rolled along a lengthwise dimension 74 of the object, as indicated at 84, until reaching an opposite dimensional edge of the object. The rotation of measuring wheel 34, as indicated by arrows 82, along lengthwise dimension 74 produces an electronic "count" of the number of rotations of measuring wheel 34.

Figure 9:
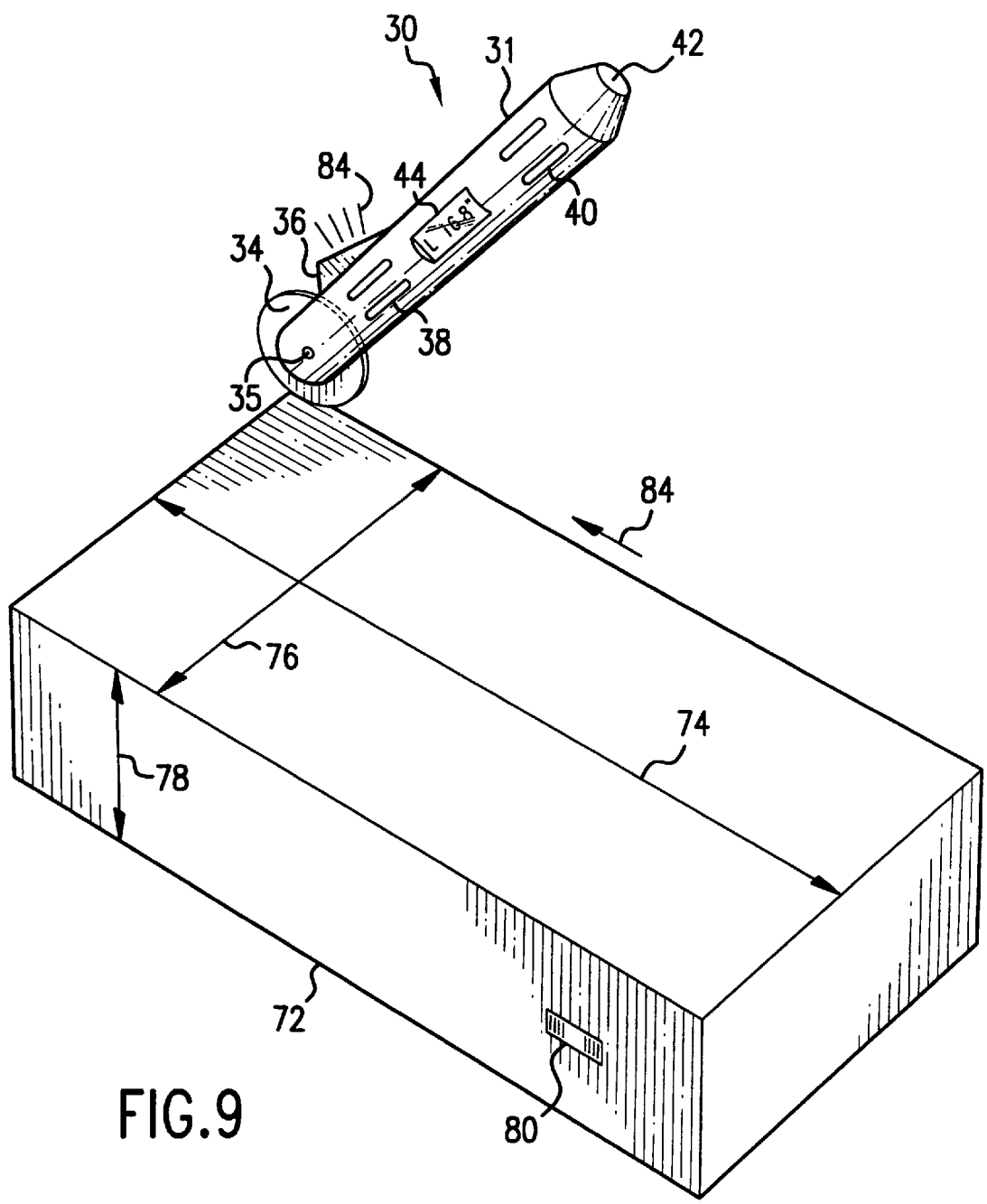
FIG. 9 illustrates an object and the dimensioning device of the present invention after measuring a lengthwise dimension of the object.

FIG. 9 illustrates object 72 and dimensioning device 30 of the present invention after measuring lengthwise dimension 74 of the object. After dimensional device 30 has been rolled along the entire lengthwise dimension 74 of object 72, as described previously in reference to FIG. 8, processor 56 converts the count of the number of rotations of measuring wheel 34 into a linear distance traveled by the measuring wheel. The resultant lengthwise measurement is shown in display 44.

In one embodiment, a user then transmits the lengthwise measurement result to remote receiving device 41, by pushing dimensional control 38. The user then proceeds to measure a width dimension 76 and a height dimension 78 of the object in the same manner as described above, with a separate data transmission following each separate measurement.

In an alternative embodiment, the user measures length 74, width 76, and height 78 of object 72 before transmitting all three dimensional measurements in a single data transmission operation. In either embodiment, the dimensioning of an object should typically take no longer than 5 seconds.

Figure 10:
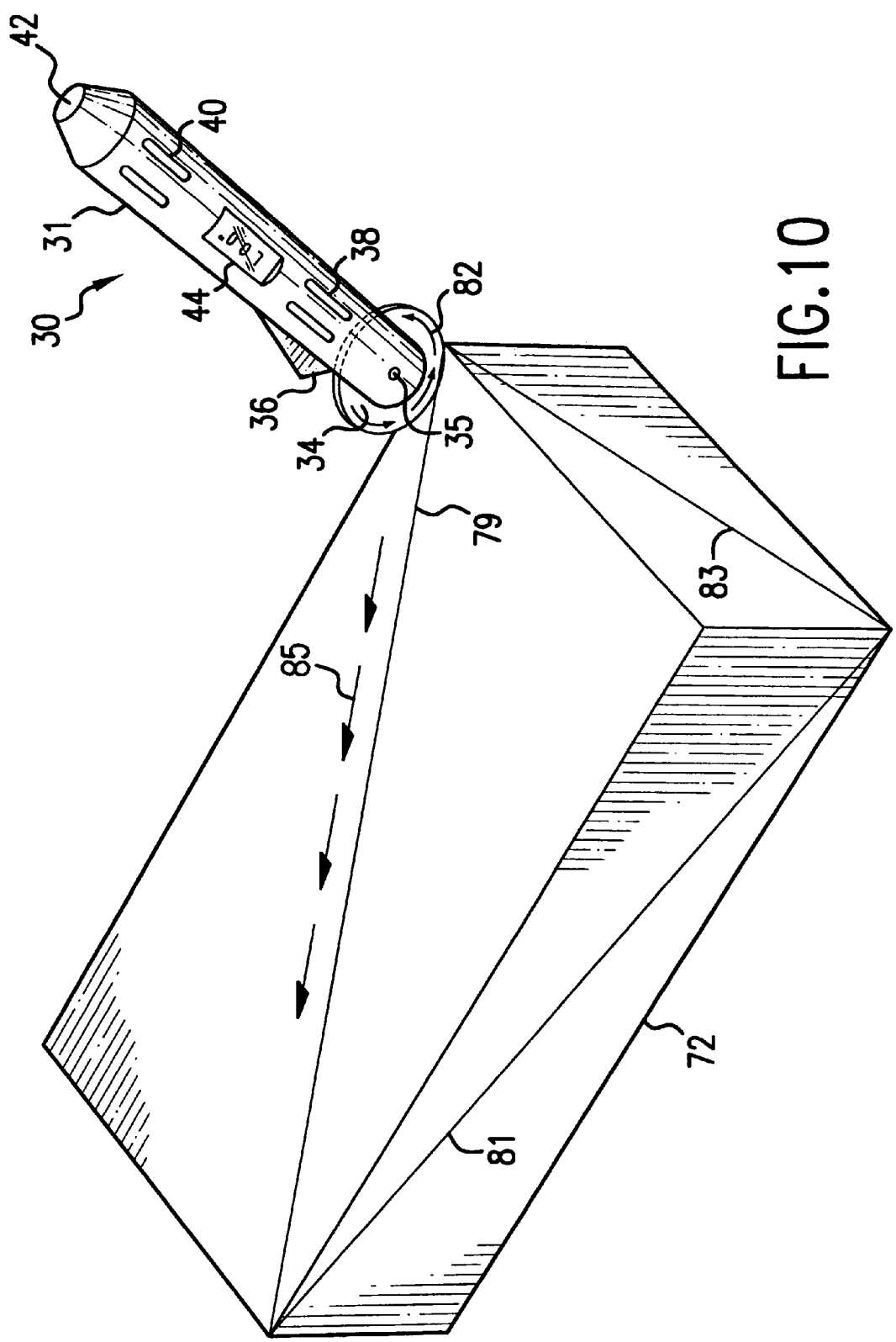
FIG. 10 illustrates an object and the dimensioning device of the present invention prior to measuring a diagonal of a lengthwise planar surface of the object.

FIG. 10 illustrates dimensioning device 30 of the present invention prior to measuring a diagonal 85 of a lengthwise planar surface of object 72 and FIG. 11 illustrates dimensioning device 30 after measuring diagonal 85 of the lengthwise planar surface of object 72. The measurement of diagonal 85 of lengthwise planar surface of an object is accomplished in the much the same manner as that employed in measuring a lengthwise dimension of object 72, as illustrated in FIG. 8 and FIG. 9. That is, after activation and initialization, measuring wheel 34 is placed at a dimensional corner of the lengthwise planar surface, and rolled along a diagonal dimension 79 of object 72, as illustrated at 85, until reaching an opposite dimensional corner of the lengthwise planar surface. The rotation 82 of measuring wheel 34 along diagonal dimension 79 of object 72 produces an electronic "count" of the number of rotations of measuring wheel 34. The count of the number of rotations of measuring wheel 34 is then converted into a linear distance traveled by processor 56.

In one embodiment, a user then transmits the first diagonal measurement result to remote receiving device 41, by pushing dimensional control 38. The user then proceeds to measure a second diagonal 83 of the widthwise planar surface and a third diagonal 85 of the heightwise planar surface in the same manner described above, with a separate data transmission occurring after each separate measurement. Thus, in this embodiment, three separate transmissions of dimensional information are made after obtaining each dimensional measurement.

In an alternative embodiment, the user measures lengthwise diagonal 85, widthwise diagonal 83 and heightwise diagonal 81 dimensions of object 72 before transmitting all three dimensional measurements in a single data transmission operation. In either embodiment, the dimensioning of object 72 typically takes no longer than 5 seconds.

Measuring diagonals 79, 81 and 83 of the planar surfaces of object 72 offers some advantages over measuring the length, width and height of an object, as illustrated in FIGS. 8 and 9. First, measuring the diagonal of a planar surface involves rolling dimensioning device 30 between two well defined points (the corners of the planar surface), thus minimizing the amount of lateral error introduced as the dimensioning device 30 is rolled from point-to-point. Also, measuring diagonals 79, 81 and 83 of object 72 results in a longer distance measurements, such that a fixed measuring error will have less impact on the diagonal measurements than on the length, width and height measurements illustrated in FIGS. 8 and 9.

Equation I represents the mathematical relationship between the measured diagonals 79, 81, and 83 and the length, width, and height (illustrated at 111, 113, and 115, respectively in FIG. 11B) of object 72. Equation II solves for the length, width and height measurements (111, 113, and 115, respectively) of object 72 based on the measured values of diagonals 79, 81 and 83, then illustrates how to solve for the volume of object 72, given measured diagonals 79, 81 and 83:

$$a^2+b^2=d^2 \qquad \text{EQUATION I}$$
$$a^2+c^2=e^2$$
$$b^2+c^2=f^2$$

Where:
a is the length of the measured object, as shown at 111
b is the width of the measured object, as shown at 113
c is the height of the measured object, as shown at 115
d is the length of the first measured diagonal, as shown at 79
e is the length of the second measured diagonal, as shown at 81
f is the length of the third measured diagonal, as shown at 83

$$a = \sqrt{\frac{d^2 - f^2 + e^2}{2}}$$

$$b = \sqrt{\frac{d^2 - e^2 + f^2}{2}}$$

$$c = \sqrt{\frac{e^2 - d^2 + f^2}{2}}$$

$$v^2 = a^2 b^2 c^2$$

$$v^2 = \frac{d^2 e^4 + d^2 f^4 + e^2 f^4 + d^4 e^2 + d^4 f^2 + e^4 f^2 - 2 d^2 e^2 f^2 - d^6 - e^6 - f^6}{8}$$

$$v = \sqrt{v^2}$$

EQUATION II

Where:
v is the volume of the object, and all other variables are described in EQUATION I above.

In the illustrated embodiments, object 72 is a rectangular solid, wherein the volume of object 72 is calculated by simply multiplying the length 111, width 113 and height 115 measurements, or by applying volume equation II, when the three measured diagonals (79, 81 and 83) are known. However, it is contemplated that dimensioning device 30 also supports measurements of objects 72 that are not rectangular solids.

Figure 12:
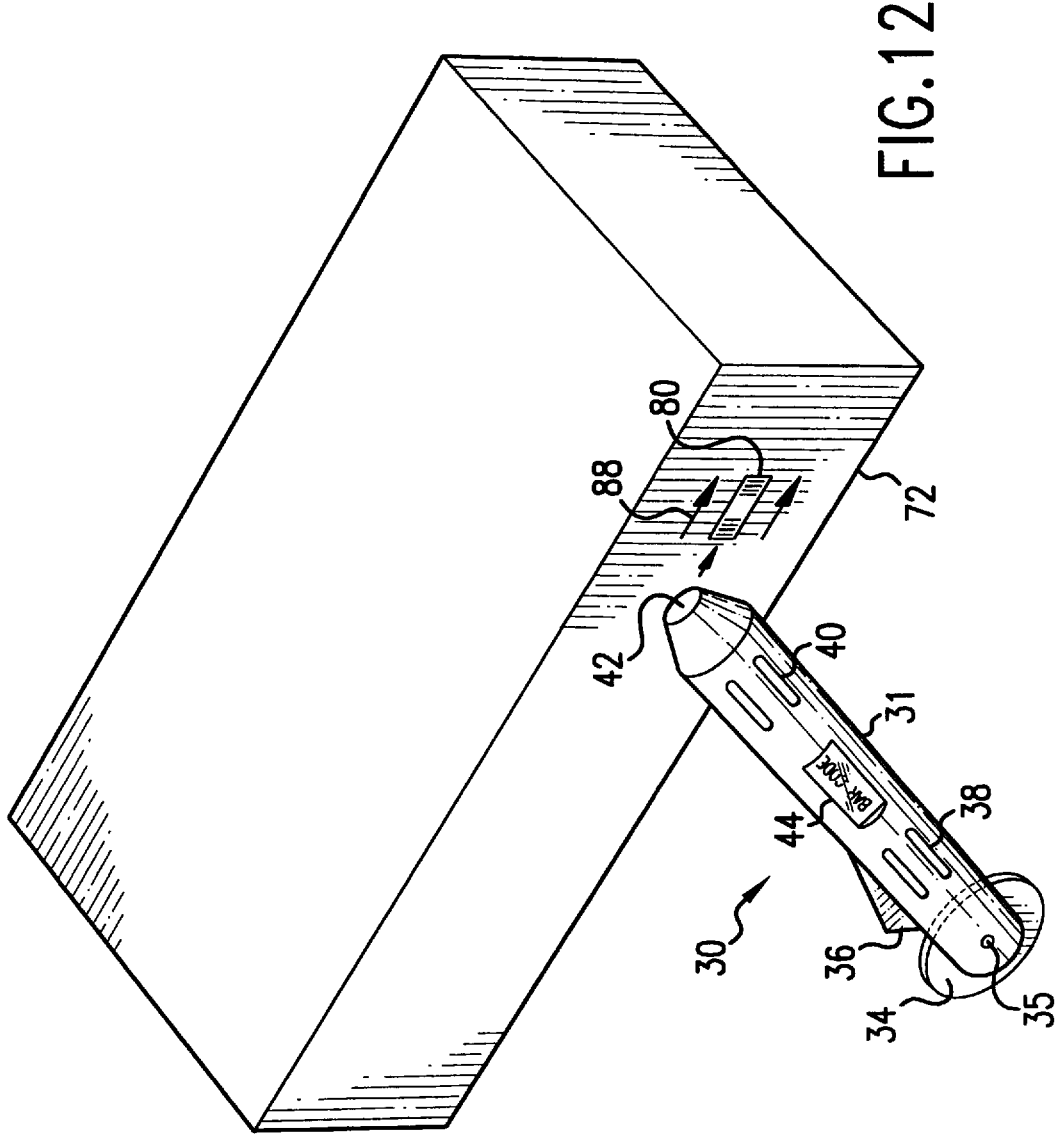
FIG. 12 illustrates an object and the dimensioning device of the present invention prior to optically reading a barcode affixed to a surface of the object.

FIG. 12 illustrates dimensioning device 30 of the present invention prior to optically reading a bar code 80 affixed to a surface of an object 72, and FIG. 13 illustrates dimensioning device 30 of the present invention after reading bar code 80 affixed to a surface of object 72. The incorporation of optical scanner 42 within dimensioning device 30 of the present invention offers several advantages. First, object's 72 identifying bar code 80 allows the object's 72 dimensional attributes to be associated with an object identifier. Thus, when dimensional information is transmitted to the remote receiving device, the remote receiving device 41 can readily associate one or more dimensional measurements with the bar code information for object 72. Secondly, the incorporation of the optical scanner 42 within a portable dimensioning device 30 eliminates the need for another separate device that a user, such as a package courier, needs to carry. Finally, the integration of both optical scanner 42 and measuring wheel 34 within one device saves time for the user when scanning and dimensioning an object 72.

When using optical scanner 42 of dimensioning device 20, a user simply positions the end of optical scanner 42 at a the leading edge of bar code 80 affixed to object to be scanned 72, and sweeps the end of optical scanner 42 across bar code 80 in a linear direction, as shown at 88. If the scanning operation is successful, dimensioning device 30 indicates a successful scan by displaying a numerical representation of bar code 80 in display 44, or by displaying a message such as "ok" in display 44 if bar code 80 was successfully read. Alternatively, dimensioning device 30 provides an indication of a successful read by optical scanner 42 with an audible tone. In another alternative embodiment, a non-contact optical scanner 42 is employed to read bar code 80, where the user simply points optical scanner 42 at the bar code, and activates the optical scanner.

Similarly, if the scanning operation is unsuccessful, dimensioning device indicates an unsuccessful scan by displaying a message such as "ERROR" or "ERR" in display 44. Alternatively, dimensioning device 30 provides an indication of an unsuccessful read by optical scanner 42 with an audible tone.

After optical scanner 42 has successfully read bar code 80, the scanned information must be sent to remote receiving device 41. In one embodiment, scanner controls 40 include a capability which enables the scanned information to be transmitted via radio frequency transmitter/antenna to remote receiving device 41 by simply pressing a scanner control button 40. In another embodiment, the dimensional measurements and the scanned information are sent simultaneously by dimensioning device 30 to remote receiving device 41.

FIGS. 14A and 14B illustrate one embodiment of the present invention wherein a light emitting diode (LED) 96, is disposed adjacent a first side of measuring wheel 34, and a photodetector 94 is disposed adjacent a second side of measuring wheel 34, such that one or more holes 90 formed within measuring wheel 34 pass between LED 96 and photodetector 94 as measuring wheel 34 undergoes rotation. As measuring wheel 34 rotates, light bursts from LED 96 will be counted by photodetector 94. Thus, in this embodiment, measuring wheel 34 revolution count is obtained optically, rather than electrically by a transducer, as previous illustrated in FIGS. 6A and 6B. Once measuring wheel 34 rotation count is determined, this rotational information is translated into a linear dimensional measurement by techniques presented above.

In another optical embodiment of the present invention, as illustrated in FIG. 14C, a side surface of measuring wheel 34 is encoded with substantially evenly spaced non-reflective and reflective segments, 91 and 93 respectively, which light from a light source 98 is projected onto as measuring wheel 34 rotates, as illustrated in FIG. 14D. Photodetector 94 counts the number of optically reflective segments 93 that pass by during the rotation of measuring wheel 34. Once the count of the number of reflective segments 93 that pass by photodetector 94 during measuring wheel 34 rotation is determined, this count is translated into a linear dimensional measurement by techniques presented above. This embodiment is optionally enhanced by using "quadrature" encoding to determine not only the amount of rotation of measuring wheel 34 but also the direction of motion of the measuring wheel.

Figure 15:
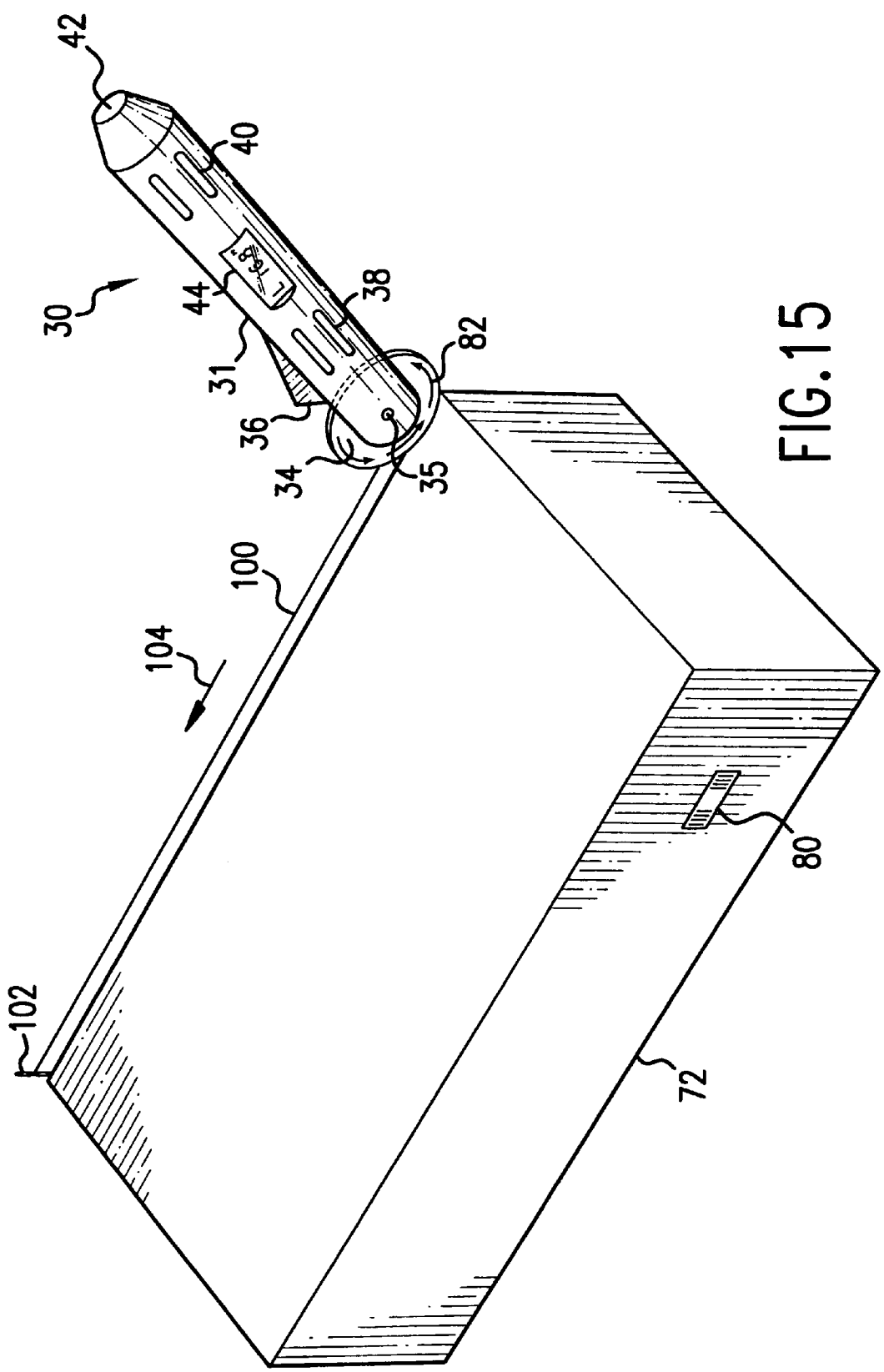
FIG. 15 illustrates one embodiment of the dimensioning device of the present invention having a measuring end of a spring-loaded filament wrapped around the measuring wheel, which when deployed by pulling the measuring end of the filament away from the measuring wheel against the tension of the spring, rotates the measuring wheel.

FIG. 15 illustrates one embodiment of the present invention wherein a spring-loaded filament 100 wrapped around measuring wheel 34 is deployed by pulling a measuring end 102 of filament 100 away from measuring wheel 34 in a linear direction 104 against the tension of a spring, thus rotating measuring wheel 34 during the deployment. In this embodiment, spring-loaded filament functions in a manner similar to a tape measure, with dimensioning device 30 positioned at one end of the object dimension to be measured, and the measuring end 102 of filament 100 positioned at the opposite end of the object dimension to be measured. As with the other embodiments described above, rotation 82 of measuring wheel 34 while filament 100 is pulled away in linear direction 104 produces an electronic "count" of the number of rotations of measuring wheel 34. The count of the number of rotations of measuring wheel 34 is then converted into a linear distance traveled by processor 56.

The present invention offers a small, lightweight and portable dimensioning device 30 for quickly scanning and measuring packages when they are picked up by a delivery service. The dimensioning device 30 has the capability to seamlessly transmit package dimension information and bar code package identification information to other radio remote equipped devices. By dimensioning packages as they are picked up, the delivery service company can quickly and efficiently match package volume requirements with available delivery resources.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An electromechanical dimensioning device comprising:

a measuring instrument for obtaining a dimensional measurement of an object, and providing a dimensional measurement signal representative of the dimensional measurement wherein the measuring instrument comprises a measuring wheel of a known circumference having an axle, at least one magnet disposed around the perimeter of the measuring wheel, and a wire coil wrapped around the axle of the measuring wheel, such that as the measuring wheel is rotated, the at least one magnet passes through the wire coil to generate electrical pulses, each electrical pulse representing an occurrence of one magnet passing through the wire coil;

a processor coupled to the measuring instrument for receiving and processing the dimensional measurement signal to generate a set of dimensional transmission data;

a radio transmitter coupled to the processor for receiving the set of dimensional transmission data from the processor and for transmitting the set of dimensional transmission data via radio waves;

an optical scanner coupled to the processor, wherein the optical scanner reads optically encoded information from the object; and a housing, wherein the measuring instrument, the processor, the radio transmitter, and the optical scanner are contained within the housing.

2. The dimensioning device of claim 1, wherein the housing is cylindrically shaped, and is approximately 6 inches long and approximately 0.5 inches in diameter.

3. The dimensioning device of claim 1, further comprising:

a power source for supplying power to the measuring instrument, the processor, and the external interface.

4. The dimensioning device of claim 3, wherein the power source comprises a battery.

5. The dimensioning device of claim 3, wherein the power source comprises a rechargeable battery.

6. The dimensioning device of claim 5, wherein the rechargeable battery is contained within the housing and the dimensioning device further comprises:

charge contacts disposed on the housing and adapted to allow connection of the rechargeable battery to an external battery charger.

7. The dimensioning device of claim 1, wherein the processor receives and processes the optically encoded information from the optical scanner, then generates a set of optical scanner transmission data.

8. The dimensioning device of claim 7, wherein the radio transmitter receives the set of optical scanner transmission data from the processor, then transmits the optical scanner transmission data via the radio waves.

9. The dimensioning device of claim 1, further comprising:

a display for displaying the operational modes of the electronic dimensioning device.

10. The dimensioning device of claim 1, wherein the measuring instrument comprises magnets which are substantially evenly spaced around the perimeter of the measuring wheel.

11. The dimensioning device of claim 1, wherein the measuring instrument further comprises an amplifier circuit for receiving and amplifying the electrical pulses.

12. The dimensioning device of claim 11, wherein the measuring instrument further comprises an edge detector circuit coupled to the amplifier circuit for receiving the amplified electrical pulses and for activating a counter signal on each occurrence of one magnet passing through the wire coil.

13. The dimensioning device of claim 12, wherein the measuring instrument further comprises a counter for summing the activations of the counter signal, and for calculating the linear distance traveled by the measuring wheel based on the known circumference of the measuring wheel.

14. The dimensioning device of claim 1, wherein the measuring instrument further comprises a spring-loaded filament wrapped around the measuring wheel, and wherein an end of the spring loaded filament is deployed to rotate the measuring wheel.

15. The dimensioning device of claim 1, wherein the dimensioning device includes at least one pushbutton to activate/deactivate the device, switch between dimensional measurements for an object, and transmit the set of dimensional transmission data.

16. The dimensioning device of claim 11, wherein the dimensioning device includes a radio receiver.

17. The dimensioning device of claim 16, wherein the radio transmitter and radio receiver arc integrated into a transceiver.

18. The dimensioning device of claim 1, wherein the dimensioning device includes at least one push button to activate/deactivate the optical scanner, clear scanned information, and send scanned information to a receiving device.

19. A method of measuring dimensional attributes of an object with an electromechanical dimensioning device having a measuring wheel of a known circumference, at least one magnet disposed around the perimeter of the measuring wheel, a wire coil wrapped around an axle of the measuring wheel, and an optical scanner contained within a housing, the method comprising the steps of:

dimensioning the object by rolling the measuring wheel along each dimensional axis of the object to produce a set of dimensional measurements wherein the dimensioning step includes:

rotating the measuring wheel so that at least one magnet passes through the wire coil, generating electrical pulses, each electrical pulse representing an occurrence of one magnet passing through the wire coil;

counting a number of the electrical pulses generated as the measuring wheel is rotated; and calculating a linear distance traveled by the measuring wheel, based on the number produced in the counting step and the known circumference of the wheel;

processing the dimensional measurements generated by dimensioning the object to produce a dimensional result;

transmitting the dimensional result via a radio interface to an external receiving device;

scanning optically encoded information on the object with the optical scanner to produce a scan result;

translating the scan result to produce a set of optical scanner transmission data; and transmitting the set of optical scanner transmission data via the radio interface to the external receiving device.

20. The method of claim 19, further comprising the steps of:

activating the dimensioning device prior to the dimensioning step; and de-activating the dimensioning device after the transmitting step.

* * * * *